(12) United States Patent
Goislot

(10) Patent No.: US 8,347,602 B2
(45) Date of Patent: Jan. 8, 2013

(54) LIQUID PROPELLANT ROCKET ENGINE WITH A PROPULSION CHAMBER SHUTTER

(75) Inventor: Hervé Goislot, Paris (FR)

(73) Assignee: SNECMA, Paris (FR)

(*) Notice: Subject to any disclaimer, the term of this patent is extended or adjusted under 35 U.S.C. 154(b) by 852 days.

(21) Appl. No.: 12/500,035

(22) Filed: Jul. 9, 2009

(65) Prior Publication Data

US 2010/0005807 A1    Jan. 14, 2010

(30) Foreign Application Priority Data

Jul. 11, 2008 (FR) ...................... 08 54773

(51) Int. Cl.
*F02K 9/00* (2006.01)
(52) U.S. Cl. ............................. 60/257; 60/258; 60/200.1
(58) Field of Classification Search .................... 60/242, 60/257, 258, 200.1
See application file for complete search history.

(56) References Cited

U.S. PATENT DOCUMENTS

| | | | | |
|---|---|---|---|---|
| 1,980,266 A | * | 11/1934 | Goddard | 60/247 |
| 2,552,497 A | | 5/1951 | Roach et al. | |
| 2,637,973 A | * | 5/1953 | Lawrence, Jr. | 60/259 |
| 2,870,599 A | | 1/1959 | Long | |
| 3,192,714 A | * | 7/1965 | Hickerson | 60/230 |
| 3,230,704 A | * | 1/1966 | Lovingham | 60/225 |
| 3,234,731 A | | 2/1966 | Dermody et al. | |
| 3,712,063 A | | 1/1973 | Andrysiak et al. | |
| 3,848,806 A | * | 11/1974 | Samuelsen et al. | 239/265.11 |
| 3,948,042 A | * | 4/1976 | Beardsley et al. | 60/242 |
| 6,964,154 B1 | * | 11/2005 | Sackheim et al. | 60/224 |
| 6,986,246 B2 | * | 1/2006 | Fujita | 60/242 |
| 7,565,797 B2 | * | 7/2009 | Nyberg et al. | 60/253 |
| 8,016,211 B2 | * | 9/2011 | Barr et al. | 239/265.19 |
| 2005/0188677 A1 | | 9/2005 | Nyberg et al. | |

FOREIGN PATENT DOCUMENTS

| | | |
|---|---|---|
| DE | 2 320 076 | 11/1974 |
| EP | 1243783 | 9/2002 |
| FR | 1 036 540 | 9/1953 |
| GB | 758785 | 10/1956 |

* cited by examiner

*Primary Examiner* — William H Rodriguez
(74) *Attorney, Agent, or Firm* — Weingarten, Schurgin, Gagnebin & Lebovici LLP

(57) ABSTRACT

A liquid propellant rocket engine with a propulsion chamber shutter, the rocket engine comprises a combustion chamber, a propellant injector device placed at an upstream first end of the combustion chamber, a nozzle throat disposed at a downstream second end of the combustion chamber remote from the upstream first end, and a diverging portion disposed downstream from the nozzle throat. A selective shutter device for the nozzle throat comprises an axially-symmetrical shutter member placed downstream from the nozzle throat, and axial rod for controlling the shutter member, a first short centering member for the control rod situated at the upstream first end of the combustion chamber level with the propellant injector device, a second short centering member for the control rod situated in the combustion chamber in the vicinity of the nozzle throat and upstream therefrom, and a system for returning the control rod of the selective shutter device for the nozzle throat to the closed position.

13 Claims, 3 Drawing Sheets

LIQUID PROPELLANT ROCKET ENGINE WITH A PROPULSION CHAMBER SHUTTER

FIELD OF THE INVENTION

The present invention relates to a liquid propellant rocket engine with a propulsion chamber shutter, the rocket engine comprising a combustion chamber, a propellant injector device disposed at an upstream first end of the combustion chamber, a nozzle throat disposed at a downstream second end of the combustion chamber remote from said upstream first end, and a diverging portion disposed downstream from the nozzle throat.

PRIOR ART

Various types of liquid propellant rocket engine are already known that include a shutter placed downstream from the nozzle throat, and a fluid or hydraulic control system for controlling the movement of the shutter so as to hold it in the open position while the rocket engine is in operation.

The need to insert a shutter downstream from the throat, and to associate it with a control system, presents a certain number of drawbacks. In particular that involves an increase in the volume of the combustion chamber and it requires long guidance to be implemented in the chamber portion (thereby leading to an unfavorable length/diameter ratio).

The use of a control system with blocking in the open position leads to an increase both in mass and in fabrication cost.

Rocket engines are also known that have a central deflector core located downstream from the nozzle throat. Such an axially-symmetrical central core nevertheless presents a position that is stationary relative to the nozzle throat and it is not designed to enable the throat to be shut.

U.S. Pat. No. 2,870,599 describes a liquid propellant rocket engine nozzle with a conical restrictor that is movable axially with the help of a rod. Nevertheless the restrictor merely constitutes a regulator member and it is not capable of shutting the nozzle throat completely.

DEFINITION AND OBJECT OF THE INVENTION

Certain propellants require ignition to be performed at a pressure within the combustion chamber that is greater than some minimum value. Under such circumstances, it is necessary to shut the nozzle throat during ignition.

The invention seeks in particular to enable the throat to be shut in that manner, but without the mass and the cost of the rocket engine being increased excessively.

The invention also seeks to enable a single rocket engine to be re-ignited a plurality of times in succession in reliable manner.

In accordance with the invention, these objects are achieved by a liquid propellant rocket engine with a propulsion chamber shutter, the engine comprising a combustion chamber, a propellant injector device disposed at an upstream first end of the combustion chamber, a nozzle throat disposed at a downstream second end of the combustion chamber remote from the upstream first end, and a diverging portion disposed downstream from the nozzle throat, wherein the rocket engine includes a selective shutter device for the nozzle throat to define at least a closed position in which the nozzle throat is shut completely, and at least one open position in which a predetermined flow section is defined through the nozzle throat, and wherein the selective shutter device comprises an axially-symmetrical shutter member placed downstream from the nozzle throat, an axial rod for controlling the shutter member, a first short centering member for the control rod situated at an upstream first end of the combustion chamber level with the propellant injector device, a second short centering member for the control rod situated in the combustion chamber in the vicinity of the nozzle throat and upstream therefrom, and a system for returning the control rod of the selective shutter device for the nozzle throat to the closed position.

The section of the annular passage through the throat when the shutter member is in the open position is equivalent to a throat section without a shutter.

The rise of pressure inside the combustion chamber naturally causes the shutter to open at a predetermined pressure.

The rocket engine of the invention presents the advantage that the shutter member always seeks to open when the pressure rises. There is thus no risk of jamming and of the pressure rising excessively.

Furthermore, the flow in the combustion chamber is disturbed little.

Finally, it is possible to obtain a significant saving both in mass and in cost, because in a preferred embodiment, with the help of the removable axially-symmetrical shutter member, the nozzle throat can be opened and closed automatically without using a control system.

In a particular embodiment, the second short centering member comprises a movable spider secured to the control rod.

In another particular embodiment, the second short centering member comprises a stationary spider secured to the combustion chamber and provided with a central hole through which the control rod is slidably mounted.

The system for returning the control rod to the closed position may comprise a rated spring.

Under such circumstances, the rise of pressure in the combustion chamber naturally causes the shutter member to open at a pressure that corresponds to the rated force of the rated spring, which is advantageously located outside the combustion chamber, level with the fuel injector device.

In a preferred embodiment, the first short centering for the control rod comprises a sleeve incorporated in the propellant injector device.

In a variant embodiment, the rocket engine includes a hydraulic control device actuated by the propellant and acting on an upstream end of the control rod to hold the selective shutter device for the nozzle throat in the open position.

Advantageously, the rocket engine includes a propellant injector device of annular type.

In an automatic version with a control system, the axially-symmetrical shutter member needs to present a spear-head or a nose-cone shape of length that is sufficient to ensure that the effect that leads to opening is stable given the static pressure difference between gas upstream and gas downstream from the nozzle.

Preferably, the axial symmetrical shutter member is made of composite material.

Advantageously, the combustion chamber is made of composite material.

According to a particular characteristic, the combustion chamber includes an internal protective coating placed between the upstream first end of the combustion chamber and the zone where the second short centering member for the control rod is situated.

In the invention, the control rod for the selective shutter device for the nozzle throat automatically causes the selective shutter device to open when the pressure in the combustion chamber exceeds a predetermined value.

The rocket engine of the invention may be applied to any propulsion system that provides thrust that can be modulated and re-ignited and that requires some minimum pressure in the chamber during ignition, the shutter member being placed in the nozzle throat shutting position during re-ignition. Applications can be envisaged for a shutter that shuts hot gases that result from combustion of liquid propellants, but also in the context of propulsion where the propellants are solid (powders, hybrids, . . . ).

BRIEF DESCRIPTION OF THE DRAWINGS

Other characteristics and advantages of the present invention appear better from the following description of particular embodiments, given by way of non-limiting indication, and with reference to the accompanying drawings, in which.

DETAILED DESCRIPTION OF PREFERRED EMBODIMENTS

Figure 1:
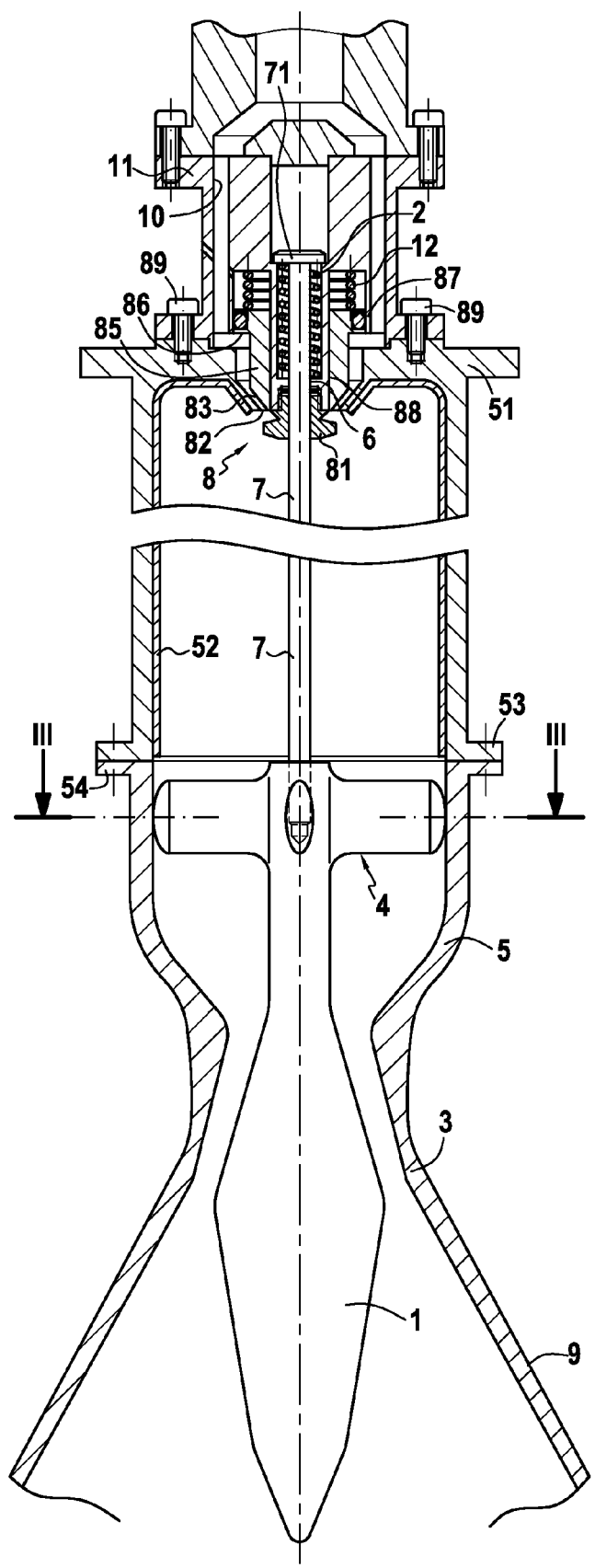
FIG. 1 is a diagrammatic axial section view of a rocket engine in a particular embodiment of the invention.

With reference to FIG. 1, there can be seen a diagram in longitudinal section of an example of a liquid-propellant rocket engine with a shutter in accordance with the invention.

The rocket engine comprises a body 5 of revolution that defines a nozzle with a combustion chamber having an upstream plate 51 serving as a support for a propellant injector device 8, a nozzle throat 3 that is suitable for being shut selectively by an axially-symmetrical shutter member 1, and a diverging portion 9 that is shown in part only in FIG. 1 and that is situated downstream from the nozzle throat 3.

The device for selectively shutting the nozzle 3 comprises an axially-symmetrical shutter member 1 in the form of a spear-head or nose-cone, an axial rod 7 for controlling the shutter member 1, and members 6, 4 for short centering the control rod 7.

In the present description, and in conventional manner, a member is said to be for "short centering" when it defines a zone of contact that can be modelled as a sphere-cylinder contact.

If the length of the contact zone is L and if the diameter of the short centering member is D, then a relationship of the following type applies:

$$L \leq 0.8D$$

Preferably, it is possible to choose the value for the length L of the contact zone to lie within the following range of values:

$$0.1D \leq L \leq 0.5D$$

In more preferred manner, it is possible to select the value for the length L of the contact zone to lie in the following range of values:

$$0.1D \leq L \leq 0.3D$$

Furthermore, likewise in conventional manner, a member is said to be for "long centering" when it defines a contact zone that can be modelled as a pivoting-sliding contact.

If the length of the contact zone is L and if the diameter for the member for long centering is D, then a relationship of the following type applies:

$$D \leq L$$

Preferably, a value may be selected for the length L of the contact zone that lies in the following range of values:

$$1.5D \leq L$$

The shutter member 1 is situated downstream from the nozzle throat 3. When the rocket engine is ignited or re-ignited, the shutter member 1 may shut the nozzle throat 3 completely. When the pressure in the combustion chamber rises after ignition or re-ignition, the shutter member 1 always seeks to open. There is therefore no risk of jamming or excessive pressure rise.

The shutter member 1 may thus open without requiring a control system once the pressure acting on the shutter member exceeds a predetermined value that induces a force transmitted by the control rod 7 and the upstream end 71 thereof, so as to compress a rated spring 2. The shutter member 1 in the form of a spear-head or a nose-cone presents a length that is sufficient to ensure that the opening force is stable given the difference in static pressure between gas at the upstream end and gas at the downstream end of the nozzle.

When the shutter member 1 is completely open, the annular flow section through the nozzle throat 3 corresponds to an equivalent throat section without a shutter.

Figures 2, 3:
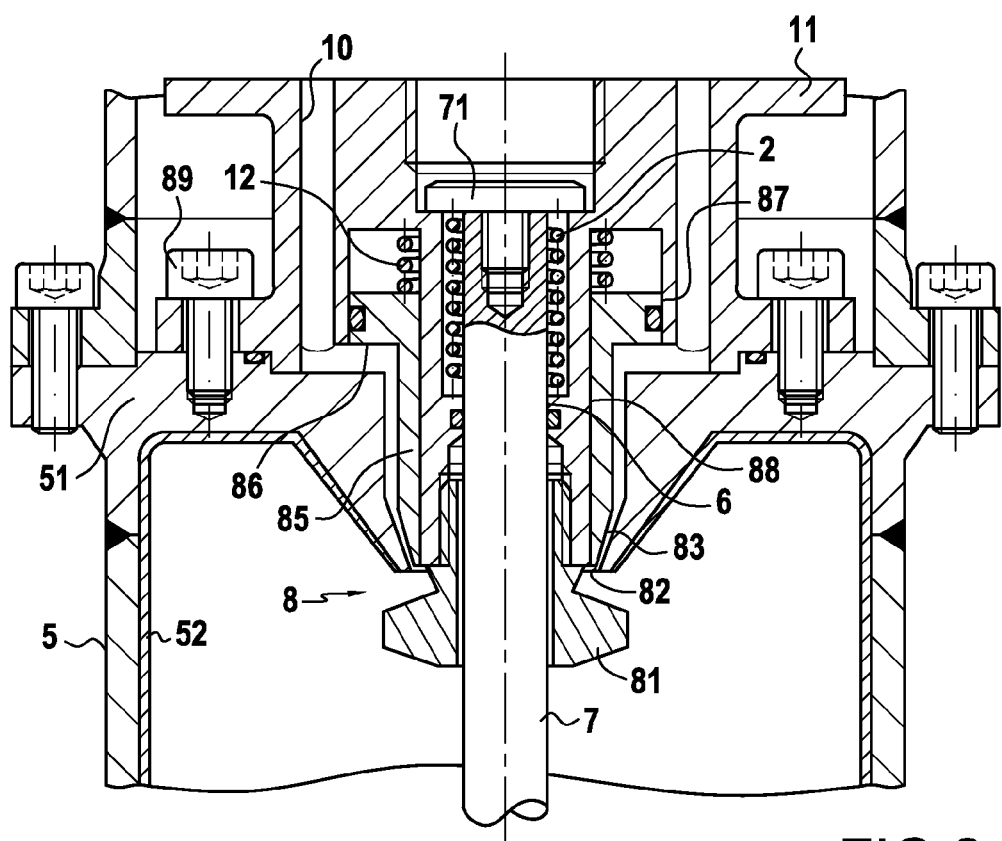
FIG. 2 is a diagrammatic axial section view showing a portion of the FIG. 1 rocket engine, with the propellant injector device and a portion of the control member for controlling shutting of the nozzle throat, in a particular embodiment of the invention.
FIG. 3 is a section view on plane III-III of FIG. 1.

The control rod 7 is associated with a short centering device 4 situated immediately upstream from the nozzle throat 3. This short centering device 4 may comprise a spider that slides along the wall of the body 5 of the combustion chamber and that is connected to the control rod 7 in stationary manner. As shown in FIG. 3, the spider may have four branches 141 to 144 forming a cross.

Figure 4:
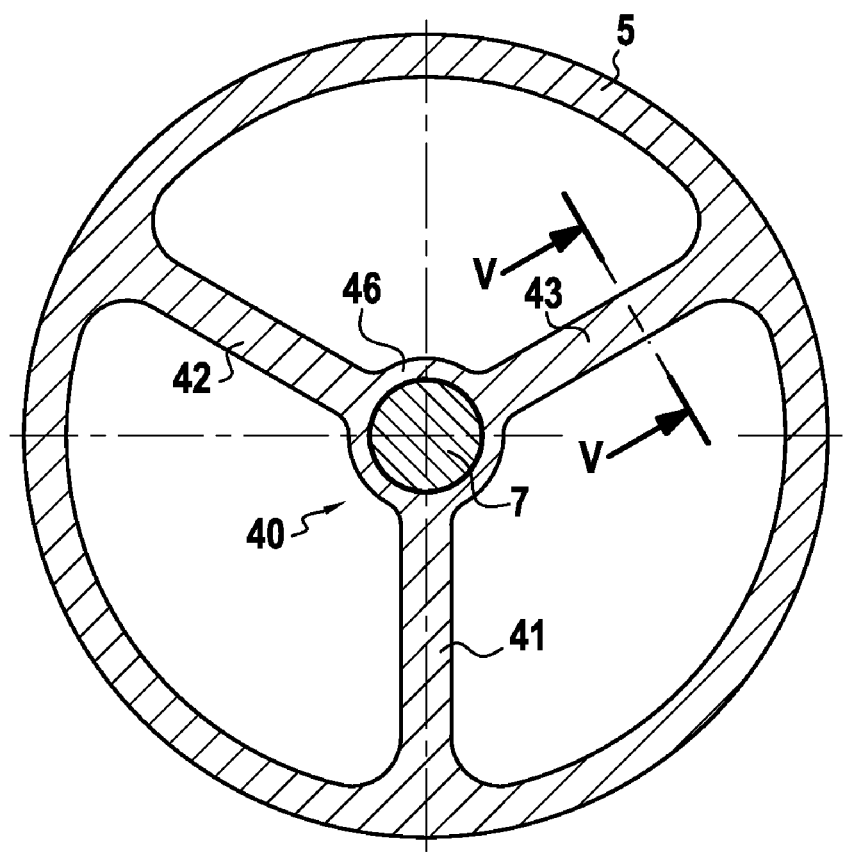
FIG. 4 is a view analogous to FIG. 3 showing a variant embodiment of a portion of the nozzle throat shutting control member.
Figure 5:
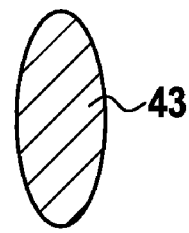
FIG. 5 is a section on plane V-V of FIG. 4.

In a variant, as shown in FIGS. 4 and 5, the short centering device 40 may comprise a stationary spider with branches 41 to 43 connected in stationary manner to the wall of the chamber body 5. Under such circumstances, the spider 40 has a central opening 46 through which the control rod 7 passes, thereby causing it to be guided by the stationary spider 40. By way of example, the spider 40 may have three branches 41 to 43 that are mutually offset by 120°.

In the embodiment of FIG. 1, with a movable spider 4, and also in the embodiment of FIG. 4 with a stationary spider 40, the branches of the spider are thin enough to avoid disturbing the flow of gas through the combustion chamber (see FIG. 5).

Another short centering device 6 is provided in the injector head 8 to guide the control rod 7 upstream from the combustion chamber and its support plate 51 for the injector head 8.

FIG. 1 is drawn diagrammatically and the diameter of the rod 7 may be greater than that shown in the drawings.

The nozzle body 5 is advantageously made of a composite material, as is the spear head-shaped shutter member 1 so as to be capable of withstanding high thermal stresses.

The nozzle body 5 may have a downstream portion defining the diverging portion 9, the nozzle throat 3, and the upstream portion of the combustion chamber in which the short centering device 4 or 40 is situated. Under such circumstances, the downstream portion is connected via flange 54 to a flange 53 of an upstream portion of the nozzle body 5, the upstream portion comprising the major portion of the combustion chamber, including the end plate 51 supporting the injector head 8. An internal protective lining 52 may be formed on the upstream portion of the nozzle body 5.

The injector head 8 may be of the annular injection type with a central endpiece 81 through which the control rod 7 slides, and an annular injection section 82 constituting an outlet section from a propellant speed-up channel 83, which propellant comes from feed holes 10 formed in a body 11 fitted on the end plate 51 and fastened thereto by fastener elements 89.

FIG. 2 shows a particular embodiment of an injector head 8 fitted to an end plate 51 of a nozzle body 5.

In FIG. 2, there can be seen the central rod 7 for controlling the shutter member passing through the central endpiece 81 of the injector head 8 and co-operating with a short centering device 6 and a rated spring 2 placed around the control rod 7 between the stationary portions of the injector head 8 defining the short centering device 6 and an end plate 71 fastened to the upstream end of the control rod 7.

The injector head 8 may include an annular movable part 85 disposed around a stationary annular portion that serves to support the endpiece 81 and that also includes the short centering device 6 for the control rod 7.

The annular movable part 85 has a frustoconical downstream end and serves to adjust the value of the annular section 82 through which propellant is injected. The annular movable part 85 co-operates with a spring 12 or with spring washers interposed between the annular movable part 85 and the end wall of a cavity in the body 11 of the injector head 8. The annular movable part 85 slides coaxially around the control rod 7, being guided relative to the body 11 of the injector head 8 by a downstream long centering member 88 and by a short centering device 87 that provides sealing relative to the stationary annular portion defining the short centering device 6 for the control rod 7.

Naturally, the injector head 8 may present various embodiments.

Furthermore, in one possible embodiment, the upstream end 71 of the control rod 7 of the shutter member 1 may be controlled hydraulically with the propellant injected by the injector head 8, so as to hold the system in the open system after an ignition stage.

What is claimed is:

1. A liquid propellant rocket engine with a propulsion chamber shutter, the engine comprising a combustion chamber, a propellant injector device disposed at an upstream first end of the combustion chamber, a nozzle throat disposed at a downstream second end of the combustion chamber remote from the upstream first end, and a diverging portion disposed downstream from the nozzle throat, wherein the rocket engine includes a selective shutter device for the nozzle throat to define at least a closed position in which the nozzle throat is shut completely, and at least one open position in which a predetermined flow section is defined through the nozzle throat, and wherein the selective shutter device comprises an axially-symmetrical shutter member placed downstream from the nozzle throat, an axial rod for controlling the shutter member, a first short centering member for the control rod situated at an upstream first end of the combustion chamber level with the propellant injector device, a second short centering member for the control rod situated in the combustion chamber in the vicinity of the nozzle throat and upstream therefrom, and a system for returning the control rod of the selective shutter device for the nozzle throat to the closed position.

2. A rocket engine according to claim 1, wherein the second short centering member comprises a movable spider secured to the control rod.

3. A rocket engine according to claim 1, wherein the second short centering member comprises a stationary spider secured to the combustion chamber and provided with a central hole through which the control rod is slidably mounted.

4. A rocket engine according to claim 1, including a hydraulic control device actuated by the propellant and acting on an upstream end of the control rod to hold the selective shutter device for the nozzle throat in the open position.

5. A rocket engine according to claim 1, wherein the system for returning the control rod to the closed position comprises a rated spring.

6. A rocket engine according to claim 1, wherein the first short centering for the control rod comprises a sleeve incorporated in the propellant injector device.

7. A rocket engine according to claim 1, including a propellant injector device of annular type.

8. A rocket engine according to claim 1, wherein the axially-symmetrical shutter member is in the form of a spearhead or a nose-cone.

9. A rocket engine according to claim 1, wherein the axial symmetrical shutter member is made of composite material.

10. A rocket engine according to claim 1, wherein the combustion chamber is made of composite material.

11. A rocket engine according to claim 1, wherein the combustion chamber includes an internal protective coating placed between the upstream first end of the combustion chamber and the zone where the second short centering member for the control rod is situated.

12. A rocket engine according to claim 1, wherein the control rod for the selective shutter device for the nozzle throat automatically causes the selective shutter device to open when the pressure in the combustion chamber exceeds a predetermined value.

13. A rocket engine according to claim 1, that is applicable to a propulsion system that delivers thrust that can be modulated and re-ignited, that requires a minimum chamber pressure on ignition, the shutter member being placed in the nozzle throat shutting position during a re-ignition stage.

* * * * *

UNITED STATES PATENT AND TRADEMARK OFFICE
CERTIFICATE OF CORRECTION

PATENT NO. : 8,347,602 B2
APPLICATION NO. : 12/500035
DATED : January 8, 2013
INVENTOR(S) : Goislot Page 1 of 1

It is certified that error appears in the above-identified patent and that said Letters Patent is hereby corrected as shown below:

In the Specification

Column 3, line 57, reads "$L \leqq 0.8D$" should read --$L \leq 0.8D$--;

Column 3, line 61, reads "$0.1D \leqq L \leqq 0.5D$" should read --$0.1D \leq L \leq 0.5D$--;

Column 3, line 65, reads "$0.1D \leqq L \leqq 0.3D$" should read --$0.1D \leq L \leq 0.3D$--;

Column 4, line 8, reads "$D \leqq L$" should read --$D \leq L$--; and

Column 4, line 13, reads "$1.5D \leqq L$" should read --$1.5D \leq L$--.

Signed and Sealed this
Twenty-fourth Day of December, 2013

Margaret A. Focarino
*Commissioner for Patents of the United States Patent and Trademark Office*